United States Patent [19]
Akamatsu

[11] Patent Number: 6,145,078
[45] Date of Patent: Nov. 7, 2000

[54] DATA PROCESSING APPARATUS AND METHOD OF STARTING-UP EXTENSIONS

[75] Inventor: Junko Akamatsu, Tokyo, Japan

[73] Assignee: NEC Corporation, Tokyo, Japan

[21] Appl. No.: 09/203,591

[22] Filed: Dec. 2, 1998

[30] Foreign Application Priority Data

Dec. 2, 1997 [JP] Japan ..................................... 9-331718

[51] Int. Cl.[7] .................................................. G06F 9/445
[52] U.S. Cl. .............................. 713/2; 713/100; 712/209; 710/10
[58] Field of Search .................................. 713/1, 2, 100; 712/15, 208, 209, 227; 709/220, 222, 301; 710/8, 10, 121

[56] References Cited

U.S. PATENT DOCUMENTS

| | | | |
|---|---|---|---|
| 5,504,922 | 4/1996 | Seki et al. ..................................... | 712/1 |
| 5,692,190 | 11/1997 | Williams ..................................... | 713/2 |
| 5,694,582 | 12/1997 | Pearce ..................................... | 395/500 |
| 5,694,583 | 12/1997 | Williams et al. ............................ | 713/2 |
| 5,958,054 | 9/1999 | O'Connor et al. ....................... | 713/300 |
| 6,035,116 | 3/2000 | Terada et al. ............................. | 703/24 |
| 6,049,316 | 4/2000 | Nolan et al. ................................. | 345/1 |

FOREIGN PATENT DOCUMENTS

| | | |
|---|---|---|
| 8-161250 | 6/1996 | Japan . |
| 8-286996 | 11/1996 | Japan . |
| 8-339304 | 12/1996 | Japan . |
| 10-21088 | 1/1998 | Japan . |

*Primary Examiner*—Reba I. Elmore
*Assistant Examiner*—Ri Jue Mai
*Attorney, Agent, or Firm*—McGinn & Gibb, P.C.

[57] ABSTRACT

There is provided a data processing apparatus including (a) a central processing unit, (b) a first memory, (c) a system bus controller electrically connected to both the central processing unit and the first memory, (d) a system bus electrically connected to the system bus controller, (e) a second memory electrically connected to the system bus and including an operation system, (f) a third memory electrically connected to the system bus and including a system firmware, (g) at least one extension including therein a fourth memory which is electrically connected to the system bus and includes BIOS code having an architecture different from an architecture of the central processing unit and acting as a program for implementing initialization and start-up, (h) a fifth memory electrically connected to the system bus, (i) an emulation system for driving the operation system to thereby emulate the BIOS code so that the BIOS code has the same architecture as an architecture of the central processing unit, and for storing the thus emulated BIOS code in the fifth memory, and (j) a starter for starting-up the extension through the use of the emulated BIOS code. In accordance with the data processing apparatus, if the fourth memory is emulated once, the extension can be started-up merely by using BIOS code which has been already emulated and stored in the fifth memory. It is no longer necessary to emulate the fourth memory each time the extension is to be started-up.

38 Claims, 3 Drawing Sheets

DATA PROCESSING APPARATUS AND METHOD OF STARTING-UP EXTENSIONS

BACKGROUND OF THE INVENTION

1. Field of the Invention

The invention relates to a data processing apparatus, and more particularly to a system for starting-up an extension connected to the data processing apparatus and including therein BIOS code having architecture different from architecture of a central processing unit.

Herein, BIOS is short for "Basic Input Output System", and is a program for implementing initialization and start-up.

2. Description of the Related Art

In a conventional data processing apparatus including an external extension in which BIOS code having an architecture different from an architecture of a central processing unit (hereinafter, central processing unit is referred to simply as "CPU") is mounted, when the extension is to be started-up during a system is being booted, it was necessary for a system firmware stored in a memory such as a read only memory (ROM) to be provided with the same functions as those of BIOS code, or be provided with an emulation function by which a machine language having a different architecture is converted into a machine language readable by CPU.

Japanese Unexamined Patent Publication No. 8-286996 having been published on Nov. 1, 1996 has suggested a driver for driving an extension in which BIOS code having an architecture different from an architecture of CPU is mounted, and which is electrically connected to a data processing apparatus. When the extension is to be started-up during a system is being booted, an emulator mounted in an operation system is used to thereby emulate a code of the extension to the same code of CPU, whereby starting-up the extension.

The above-mentioned drive system wherein it is necessary for a system firmware stored in a memory such as a read only memory (ROM) to be provided with the same functions as those of BIOS code, or be provided with an emulation function by which a machine language having a different architecture is converted into a machine language readable by CPU, is accompanied with a problem of poor system development efficiency and an increase in usage of ROM. This is because too many functions are necessary to be mounted in a system firmware.

The driver suggested in the above-mentioned Japanese Unexamined Patent Publication No. 8-286996 has improved a system development efficiency, and reduced usage of ROM. However, the driver is accompanied with another problem that when an extension which has a lot of kinds of BIOS codes and is electrically connected to an operation system is to be started-up during a system is being booted, BIOS codes have to be emulated each time when the operation system is started-up. This results in waste of time necessary for starting-up the operation system.

SUMMARY OF THE INVENTION

In view of the above-mentioned problem of prior art, it is an object of the present invention to provide a data processing apparatus and a method of starting-up an extension, both of which make it no longer necessary to emulate BIOS code having been once emulated, each time the data processing apparatus is to be started-up, and both of which reduce usage of ROM with the result of reduction in running cost.

Another object of the present invention is to provide a recording medium readable by a computer, storing a program therein for causing a computer to either act as the above-mentioned data processing apparatus or carry out a method of starting-up an extension in which a memory which includes BIOS code having an architecture different from an architecture of a central processing unit is mounted.

In one aspect, the present invention provides a data processing apparatus including (a) a central processing unit, (b) a first memory, (c) a system bus controller electrically connected to both the central processing unit and the first memory, (d) a system bus electrically connected to the system bus controller, (e) a second memory electrically connected to the system bus and including an operation system, (f) a third memory electrically connected to the system bus and including a system firmware, (g) at least one extension including therein a fourth memory which is electrically connected to the system bus and includes BIOS code having an architecture different from an architecture of the central processing unit and acting as a program for implementing initialization and start-up, (h) a fifth memory electrically connected to the system bus, (i) an emulation system for driving the operation system to thereby emulate the BIOS code so that the BIOS code has the same architecture as an architecture of the central processing unit, and for storing the thus emulated BIOS code in the fifth memory, and (d) a starter for starting-up the extension through the use of the emulated BIOS code.

It is preferable for the data processing apparatus to further include a recording medium storing therein a program used for starting-up the extension.

The fifth memory is preferably a non-volatile random access memory. It is preferable that the operation system includes an emulator for emulating the BIOS code so that the BIOS code has the same architecture as an architecture of the central processing unit, in which case, it is also preferable that the first memory has a first area for temporarily storing the emulated BIOS code therein, and a second area for temporarily loading the emulator therein.

The fifth memory may have a third area for storing the emulated BIOS code which includes identification data.

It is preferable that the system firmware includes (a) a first detector for detecting whether the emulated BIOS code for a designated extension exists in the third area, (b) an emulation code storing device for storing the emulated BIOS code loaded into the first area, in the third area, (c) a flag setter for setting a flag in the BIOS code stored in the third area, the flag indicating that the fourth memory was properly emulated, (d) an extension starter for reading out the emulated BIOS code stored in the fifth memory, loading the thus read-out emulated BIOS code into the first area, and implementing initialization and start-up of a designated extension, (e) an emulator searcher for searching the emulator included in the operation system, (f) a second detector for detecting whether BIOS code written in a machine language convertible by the emulator is stored in the fourth memory, (g) an emulator loader for loading the emulator into the second area, and (h) a BIOS code loader for causing the emulator to convert BIOS code stored in the fourth memory into a machine language of architecture executable by the central processing unit.

For instance, the emulation system may be designed to be comprised of the emulation code storing device, the flag setter, the emulator searcher, the second detector, the emulator loader, the BIOS code loader, and the second area. The starter may be designed to be comprised of the first detector, the extension starter, and the first area.

It is preferable that the emulation code storing device stores the emulated BIOS code in the third area, preferably, in a compressed condition. It is also preferable that the extension starter reads out an emulated BIOS code stored in the third area, and loads the thus read-out BIOS code into the first area to thereby initialize and start-up a designated extension. The extension starter may be designed to thaw the emulated BIOS code, if the emulated BIOS code is compressed.

The data processing apparatus may include a plurality of system buses, in which case, the extension is preferably electrically connected to all of the system buses.

In another aspect, the present invention provided a method of starting-up an extension in which a memory which includes BIOS code having an architecture different from an architecture of a central processing unit is mounted, including the steps of (a) checking whether an emulated BIOS code for a designated extension exists in a memory, (b) converting the emulated BIOS code into a machine language of an architecture executable by the central processing unit, and storing the thus converted machine language in the memory, if the emulated BIOS code does not exist in the memory, and (c) reading an emulated BIOS code for a designated extension out of the memory, and initializing and then starting-up the extension, if the emulated BIOS code exists in the memory.

It is preferable that the method further includes the step of thawing the emulated BIOS code before the extension is initialized and started-up, and/or the step of setting a flag indicating that emulation is properly implemented.

In still another aspect, the present invention provides a recording medium readable by a computer, storing a program therein for causing a computer to act as the above-mentioned data processing apparatus.

The present invention further provides a recording medium readable by a computer, storing a program therein for causing a computer to carry out the above-mentioned method of starting-up an extension in which a memory which includes BIOS code having an architecture different from an architecture of a central processing unit is mounted.

In accordance with the present invention, when an extension in which a memory, such as an extended read only memory, including BIOS code having an architecture different from an architecture of a central processing unit is mounted and which is electrically connected to a data processing apparatus is to be started-up, what is necessary to do is to once emulate the memory. If the memory is once emulated, BIOS code having been already emulated and stored in another memory such as a non-volatile read access memory may be used to start-up the extension. It is no longer necessary to emulate the memory each time the extension is to be started-up.

The present invention makes it also no longer necessary for the extension to mount an emulator for emulation of BIOS code. Since emulated BIOS code can be stored in a memory in a compressed condition, usage of read only memory can be reduced, resulting in reduction in running cost.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
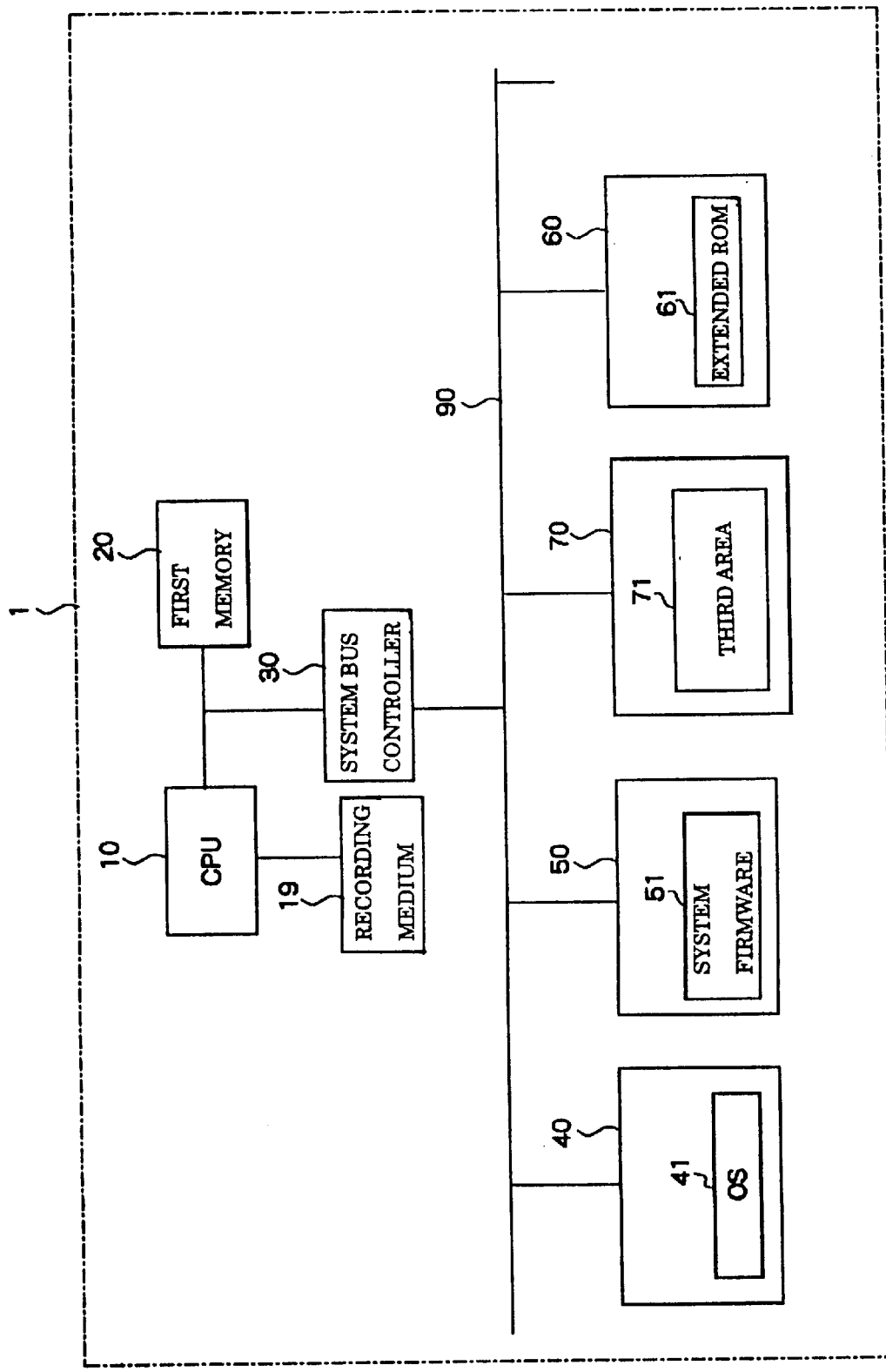
FIG. 1 is a block diagram of a data processing apparatus in accordance with a preferred embodiment of the present invention.
Figure 2:
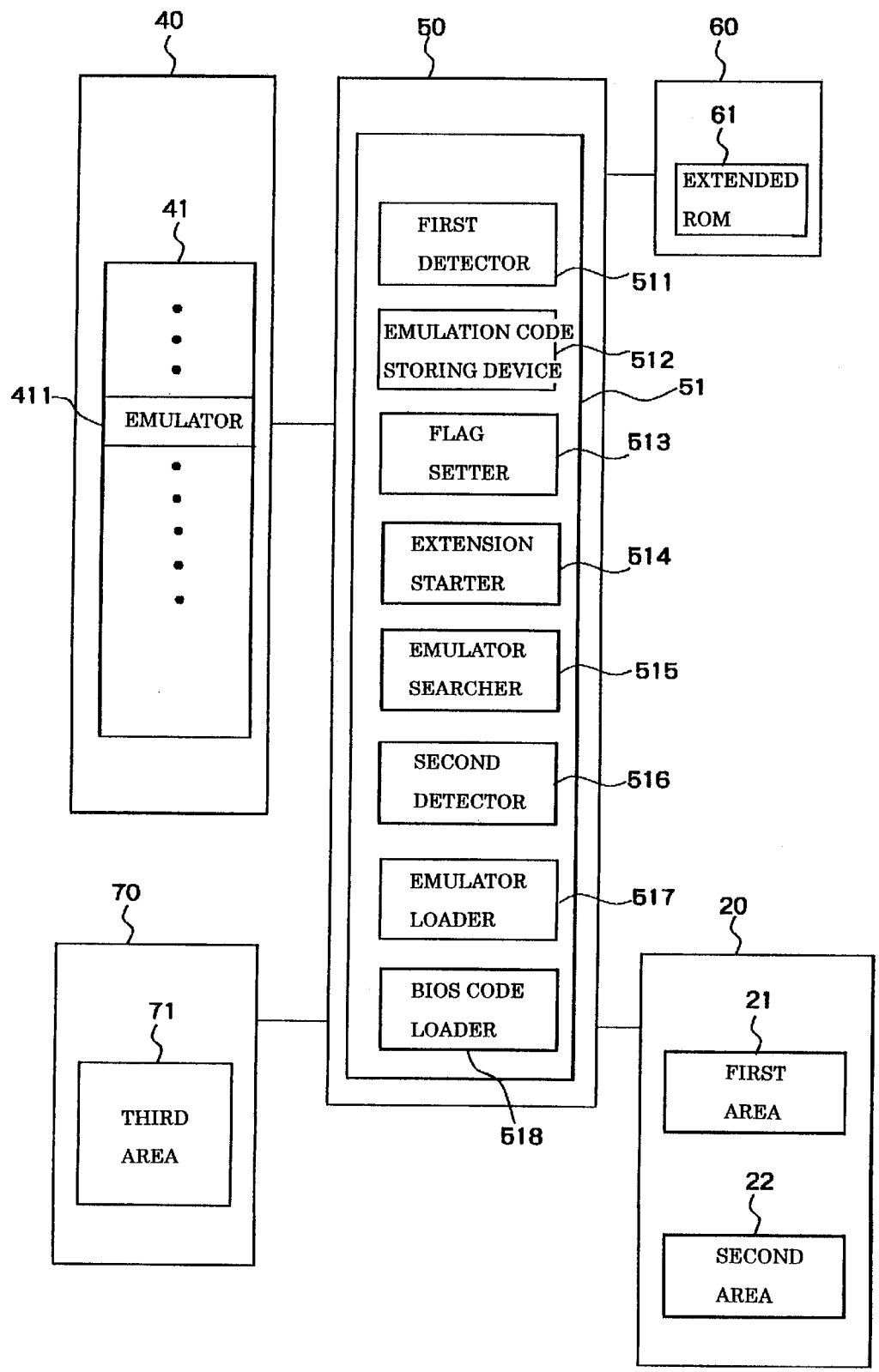
FIG. 2 is a block diagram of a data processing apparatus implementing start-up of an extension.

FIG. 1 illustrates a data processing apparatus 1 in accordance with an embodiment of the present invention. FIG. 2 illustrates a structure for starting-up an extension of the data processing apparatus.

The data processing apparatus 1 illustrated in FIG. 1 is comprised of a central processing unit (CPU) 10, a first memory 20, a system bus controller 30 electrically connected to both CPU 10 and the first memory 20, a system bus 90 electrically connected to the system bus controller 30, an external storage unit 40 as a second memory, electrically connected to the system bus 90 and including an operation system (hereinafter, operation system is referred to simply as "OS") 41, a read only memory (hereinafter, referred to simply as "ROM") 50 as a third memory electrically connected to the system bus 90 and including a system firmware 51, an extension 60 including therein an extended ROM 61 as a fourth memory which is electrically connected to the system bus 90 and includes BIOS code having an architecture different from an architecture of CPU 10 and acting as a program for implementing initialization and start-up, a non-volatile random access memory (hereinafter, referred to simply as "NVRAM") 70 as a fifth memory electrically connected to the system bus 90, and a recording medium 19 storing therein a control program used for starting-up the extension 60.

As illustrated in FIG. 2, the first memory 20 includes a first area 21 for temporarily storing therein BIOS code having been emulated so as to have the same architecture as an architecture of CPU 10, and a second area 22 for temporarily loading an emulator therein.

The external storage unit 40 includes OS 41 having been installed thereinto in advance. The operation system OS 41 can be booted in the system firmware 51 executed when the data processing apparatus 1 is to be started-up.

The operation system OS 41 includes an emulator 411 which emulates BIOS code so that it has the same architecture as an architecture of CPU 10.

The non-volatile random access memory NVRAM 70 is designed to have a third area 71 in which emulated BIOS code is stored in a compressed condition together with a flag indicating that emulation has been properly implemented.

As illustrated in FIG. 2, the system firmware 51 included in ROM 50 has a first detector 511 for detecting whether emulated BIOS code for a designated extension 60 exists in the third area 71 of NVRAM 70, an emulation code storing device 512 for storing emulated BIOS code for the extended ROM 61, loaded into the first area, in the third area 71 in a compressed condition, a flag setter 513 for setting a flag in BIOS code stored in the third area 71, to indicate that emulation for the extended ROM 61 was properly implemented, an extension starter 514 for reading out emulated BIOS code stored in NVRAM 70, thawing the thus read-out emulated BIOS code, loading the BIOS code into the first area 21 of the first memory 20, and implementing initialization and start-up of the extension 60, an emulator searcher 515 for searching the emulator 411 among a group of modules included in OS 41 stored in the external storage unit 40, in order to emulate BIOS code of the extended ROM 61 so that it has the same architecture as an architecture of CPU 10, a second detector 516 for detecting whether BIOS code written in a machine language convertible by the emulator 411 is stored in the extended ROM 61 mounted in the designated extension 60, an emulator loader 517 for loading the emulator 411 into the second area 22 of the first memory 20 after the emulator 411 has been address-solved, and a BIOS code loader 518 for causing the emulator 411 to convert BIOS code stored in the extended ROM 61 into a machine language of an architecture executable by CPU 10, and then, load the BIOS code into the first area 21 of the memory 20, after the emulator 411 has been loaded into the first memory 20.

The emulation code storing device 512, the flag setter 513, the emulator searcher 515, the second detector 516, the emulator loader 517, the BIOS code loader 518, and the second area 22 cooperate with one another to thereby constitute an emulation system defined in claim 1.

The first detector 511, the extension starter 514, and the first area 21 cooperate with one another to thereby constitute a starter defined in claim 1.

Figure 3:
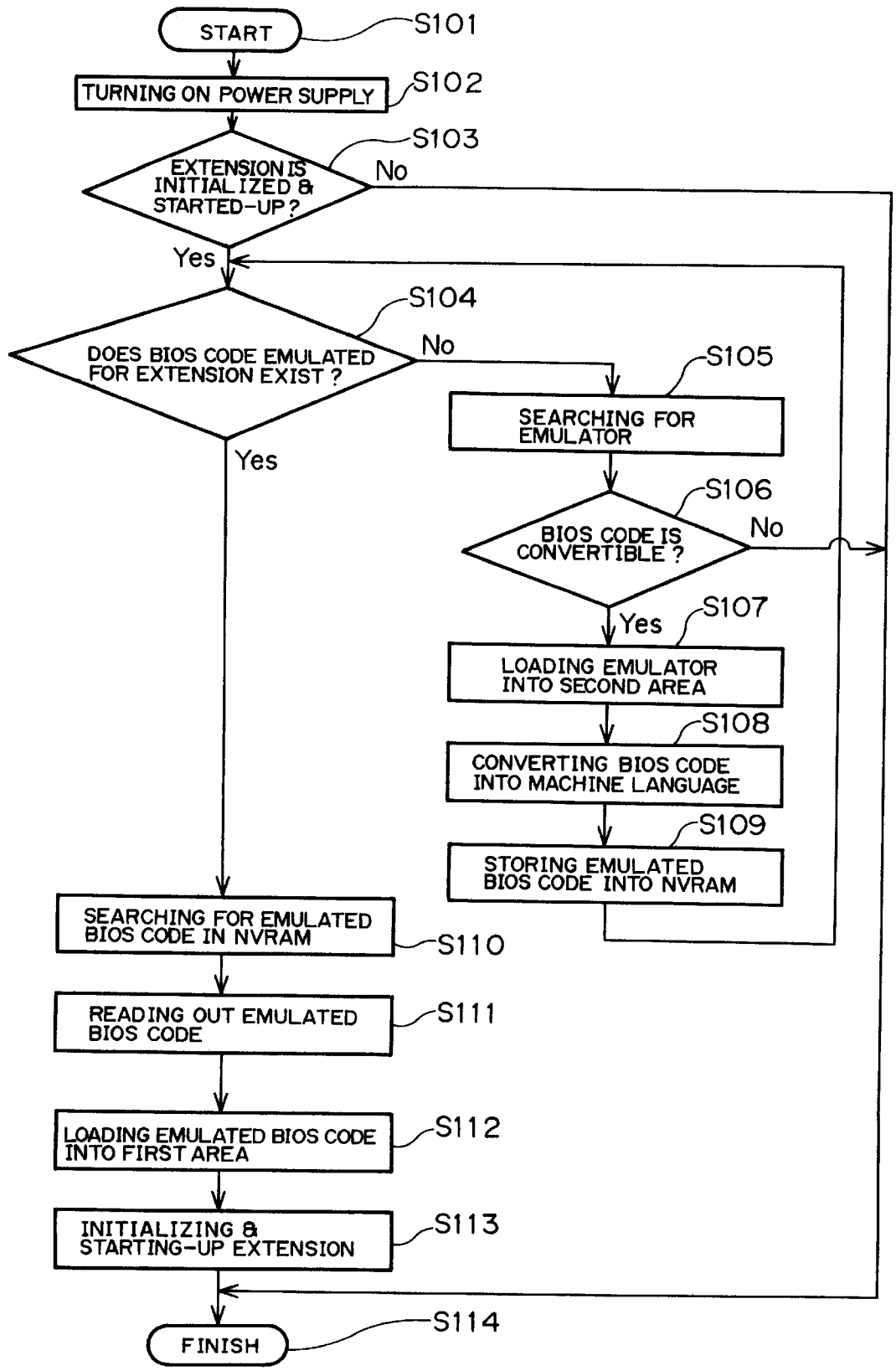
FIG. 3 is a flow chart of a method of starting-up an extension, in accordance with the present invention.

An operation of the data processing apparatus in accordance with the embodiment is explained hereinbelow with reference to FIG. 3 which is a flow chart of a method of starting-up the extension 60.

When the method starts in step 101, a power supply is turned on in step 102. Then, it is determined in step 103 as to whether the extension 60 is initialized and caused to start-up.

If the extension 60 is to be initialized and started-up, the first detector 511 constituting a part of the system firmware 51 stored in ROM 50 detects whether BIOS code having been already emulated for the extension 60 exists in the third area 71 of NVRAM 70, in step 104.

If BIOS code having been emulated for the designated extension 60 does not exist in the third area 71, the emulator searcher 515 constituting a part of the system firmware 51 searches the emulator 411 among a group of modules included in OS 41 stored in the external storage unit 40, in step 105.

After the emulator 411 has been searched, the second detector 516 constituting a part of the system firmware 51 detects whether BIOS code written in a machine language convertible by the emulator 411 is stored in the extended ROM 61 mounted in the designated extension 60, in step 106. If BIOS code stored in the extended ROM 61 is written in a machine language convertible by the emulator 411 into a machine language of CPU 10, the emulator loader 517 constituting a part of the system firmware 51 loads the emulator 411 into the second area 22 of the first memory 20 after address-solving the emulator 411, in step 107.

The BIOS code loader 518 constituting a part of the system firmware 51 causes the emulator 411 to convert BIOS code stored in the extended ROM 61 into a machine language of an architecture executable by CPU 10, in step 108.

Then, the BIOS code loader 518 causes the emulation code storing device 512 to load the thus emulated BIOS code into the third area 71 of NVRAM 70 in a compressed condition.

Further, the BIOS code loader 518 causes the flag setter 513 to set a flag at the head of BIOS code stored in the third area 71 in order to indicate that emulation was properly implemented, in step 109.

Then, returning back to the step 104, the first detector 511 detects whether BIOS code having been already emulated for the extension 60 exists in the third area 71 of NVRAM 70.

If BIOS code having been already emulated for the extension 60 exists in the third area 71 of NVRAM 70, the first detector 511 constituting a part of the system firmware 51 stored in ROM 50 retrieves BIOS code having been emulated for the extension 60, in NVRAM 70, in step 110.

When the flag setter 513 has detected a flag indicating that BIOS code for the extension 60 was emulated, the extension starter 514 reads out BIOS code having been emulated for the extension 60, stored in NVRAM 70, in step 111.

The thus read-out BIOS code is loaded into the first area 21 of the first memory while being thawed, in step 112.

Then, the extension 60 is initialized and started-up in step 113. Thus, the start-up of the extension 60 is completed in step 114.

In the above-mentioned embodiment, BIOS code is stored in the third area 71 in a compressed condition. However, it should be noted that BIOS code may be stored in the third area 17 without being compressed.

The recording medium 19 such as a floppy disc stores therein a control program used for starting-up the extension 60. The control program is read out into CPU 10, and controls an operation of CPU 10. Specifically, CPU 10 is controlled by the control program to thereby implement steps as follows.

First, CPU 10 controlled by the control program causes the first detector 511 constituting a part of the system firmware 51 stored in ROM 50 to detect whether BIOS code having been already emulated for the extension 60 exists in the third area 71 of NVRAM 70.

If BIOS code having been emulated for the designated extension 60 does not exist in the third area 71, CPU 10 controlled by the control program causes the emulator searcher 515 to search the emulator 411 in OS 41 stored in the external storage unit 40.

Then, CPU 10 controlled by the control program causes the second detector 516 to detect whether BIOS code written in a machine language convertible by the emulator 411 is stored in the extended ROM. If BIOS code stored in the extended ROM 61 is written in a machine language convertible by the emulator 411 into a machine language of CPU 10, CPU 10 controlled by the control program causes the emulator loader 517 to load the emulator 411 into the second area 22.

Then, CPU 10 controlled by the control program causes the BIOS code loader 518 to convert BIOS code stored in the extended ROM 61 into a machine language of an architecture executable by CPU 10. Then, CPU 10 controlled by the control program causes the emulation code storing device 512 to load the thus emulated BIOS code into the third area 71 of NVRAM 70 in a compressed condition.

Then, CPU 10 controlled by the control program causes the flag setter 513 to set a flag indicating that emulation was properly implemented.

If BIOS code having been already emulated for the extension 60 exists in the third area 71 of NVRAM 70, CPU 10 controlled by the control program causes the first detector 511 to retrieve BIOS code having been emulated for the extension 60, in NVRAM 70. Then, CPU 10 controlled by the control program causes the flag setter 513 to confirm the flag indicating that emulation was properly implemented.

Then, CPU 10 controlled by the control program causes the extension starter 514 to read out BIOS code having been emulated for the extension 60, stored in NVRAM 70. The thus read-out BIOS code is loaded into the first area 21 of the first memory.

Then, the extension 60 is initialized and started-up.

Hereinbelow is explained an embodiment of a recording medium storing a program therein for realizing the above-mentioned data processing apparatus.

A recording medium storing a program for realizing the abovementioned data processing apparatus may be made by programming functions of the above-mentioned data processing apparatuses with a programming language readable by a computer, and recording the program in a recording medium such as CD-ROM, a floppy disc, a magnetic tape, and any other suitable means for storing a program therein.

A hard disc equipped in a server may be employed as a recording medium. It is also possible to realize the recording medium in accordance with the present invention by storing the above-mentioned computer program in a recording medium as mentioned above, and reading that computer program by other computers through a network.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-331718 filed on Dec. 2, 1997 including specification, claims, drawings and summary is incorporated herein by reference in its entirety.

What is claimed is:

1. A data processing apparatus comprising:
   (a) a central processing unit;
   (b) a first memory;
   (c) a system bus controller electrically connected to both said central processing unit and said first memory;
   (d) a system bus electrically connected to said system bus controller;
   (e) a second memory electrically connected to said system bus and including an operation system;
   (f) a third memory electrically connected to said system bus and including a system firmware;
   (g) at least one extension including therein a fourth memory which is electrically connected to said system bus and includes BIOS code having an architecture different from an architecture of said central processing unit and acting as a program for implementing initialization and start-up;
   (h) a fifth memory electrically connected to said system bus;
   (i) an emulation system for driving said operation system to thereby emulate said BIOS code so that said BIOS code has the same architecture as an architecture of said central processing unit, and for storing the thus emulated BIOS code in said fifth memory; and
   (j) a starter for starting-up said extension through the use of said emulated BIOS code.

2. The data processing apparatus as set forth in claim 1, further comprising a recording medium storing therein a program used for starting-up said extension.

3. The data processing apparatus as set forth in claim 1, wherein said fifth memory is a non-volatile random access memory.

4. The data processing apparatus as set forth in claim 1, wherein said operation system includes an emulator for emulating said BIOS code so that said BIOS code has the same architecture as an architecture of said central processing unit.

5. The data processing apparatus as set forth in claim 4, wherein said first memory has a first area for temporarily storing said emulated BIOS code therein, and a second area for temporarily loading said emulator therein.

6. The data processing apparatus as set forth in claim 1, wherein said fifth memory has a third area for storing said emulated BIOS code which includes identification data.

7. The data processing apparatus as set forth in claim 6, wherein said system firmware includes:
   (a) a first detector for detecting whether said emulated BIOS code for a designated extension exists in said third area;
   (b) an emulation code storing device for storing said emulated BIOS code loaded into said first area, in said third area;
   (c) a flag setter for setting a flag in said BIOS code stored in said third area, said flag indicating that said fourth memory was properly emulated;
   (d) an extension starter for reading out said emulated BIOS code stored in said fifth memory, loading the thus read-out emulated BIOS code into said first area, and implementing initialization and start-up of a designated extension;
   (e) an emulator searcher for searching said emulator included in said operation system;
   (f) a second detector for detecting whether BIOS code written in a machine language convertible by said emulator is stored in said fourth memory;
   (g) an emulator loader for loading said emulator into said second area; and
   (h) a BIOS code loader for causing said emulator to convert BIOS code stored in said fourth memory into a machine language of architecture executable by said central processing unit.

8. The data processing apparatus as set forth in claim 7, wherein said emulation system is comprised of said emulation code storing device, said flag setter, said emulator searcher, said second detector, said emulator loader, said BIOS code loader, and said second area.

9. The data processing apparatus as set forth in claim 7, wherein said starter is comprised of said first detector, said extension starter, and said first area.

10. The data processing apparatus as set forth in claim 7, wherein said emulation code storing device stores said emulated BIOS code in said third area.

11. The data processing apparatus as set forth in claim 7, wherein said emulation code storing device stores said emulated BIOS code in said third area in a compressed condition.

12. The data processing apparatus as set forth in claim 7, wherein said extension starter reads out an emulated BIOS code stored in said third area, and loads the thus read-out BIOS code into said first area to thereby initialize and start-up a designated extension.

13. The data processing apparatus as set forth in claim 12, wherein said extension starter thaws said emulated BIOS code, if said emulated BIOS code is compressed.

14. The data processing apparatus as set forth in claim 1, wherein said data processing apparatus includes a plurality of system buses, and wherein said extension is electrically connected to all of said system buses.

15. A method of starting-up an extension in which a memory which includes BIOS code having an architecture different from an architecture of a central processing unit is mounted, comprising the steps of:

(a) checking whether an emulated BIOS code for a designated extension exists in a memory;

(b) converting said emulated BIOS code into a machine language of an architecture executable by said central processing unit, and storing the thus converted machine language in said memory, if said emulated BIOS code does not exist in said memory; and (c) reading an emulated BIOS code for a designated extension out of said memory, and initializing and then starting-up said extension, if said emulated BIOS code exists in said memory.

16. The method as set forth in claim 15, wherein said memory is a nonvolatile read access memory.

17. The method as set forth in claim 15, wherein said emulated BIOS code is stored in said memory in a compressed condition.

18. The method as set forth in claim 17, further comprising the step of thawing said emulated BIOS code before said extension is initialized and started-up.

19. The method as set forth in claim 15, further comprising the step of setting a flag indicating that emulation is properly implemented.

20. A recording medium readable by a computer, storing a program therein for causing a computer to act as a data processing apparatus, said apparatus comprising:

(a) a central processing unit;

(b) a first memory;

(c) a system bus controller electrically connected to both said central processing unit and said first memory;

(d) a system bus electrically connected to said system bus controller;

(e) a second memory electrically connected to said system bus and including an operation system;

(f) a third memory electrically connected to said system bus and including a system firmware;

(g) at least one extension including therein a fourth memory which is electrically connected to said system bus and includes BIOS code having an architecture different from an architecture of said central processing unit and acting as a program for implementing initialization and start-up;

(h) a fifth memory electrically connected to said system bus;

(i) an emulation system for driving said operation system to thereby emulate said BIOS code so that said BIOS code has the same architecture as an architecture of said central processing unit, and for storing the thus emulated BIOS code in said fifth memory; and (j) a starter for starting-up said extension through the use of said emulated BIOS code.

21. The recording medium as set forth in claim 20, wherein said data processing apparatus further comprises a recording medium storing therein a program used for starting-up said extension.

22. The recording medium as set forth in claim 20, wherein said fifth memory is a non-volatile random access memory.

23. The recording medium as set forth in claim 20, wherein said operation system includes an emulator for emulating said BIOS code so that said BIOS code has the same architecture as an architecture of said central processing unit.

24. The recording medium as set forth in claim 23, wherein said first memory has a first area for temporarily storing said emulated BIOS code therein, and a second area for temporarily storing said emulator therein.

25. The recording medium as set forth in claim 20, wherein said fifth memory has a third area for storing said emulated BIOS code which includes identification data.

26. The recording medium as set forth in claim 25, wherein said system firmware includes:

(a) a first detector for detecting whether said emulated BIOS code for a designated extension exists in said third area;

(b) an emulation code storing device for storing said emulated BIOS code loaded into said first area, in said third area;

(c) a flag setter for setting a flag in said BIOS code stored in said third area, said flag indicating that said fourth memory was properly emulated;

(d) an extension starter for reading out said emulated BIOS code stored in said fifth memory, loading the thus read-out emulated BIOS code into said first area, and implementing initialization and start-up of a designated extension;

(e) an emulator searcher for searching said emulator included in said operation system;

(f) a second detector for detecting whether BIOS code written in a machine language convertible by said emulator is stored in said fourth memory;

(g) an emulator loader for loading said emulator into said second area; and (h) a BIOS code loader for causing said emulator to convert BIOS code stored in said fourth memory into a machine language of architecture executable by said central processing unit.

27. The recording medium as set forth in claim 26, wherein said emulation system is comprised of said emulation code storing device, said flag setter, said emulator searcher, said second detector, said emulator loader, said BIOS code loader, and said second area.

28. The recording medium as set forth in claim 26, wherein said starter is comprised of said first detector, said extension starter, and said first area.

29. The recording medium as set forth in claim 26, wherein said emulation code storing device stores said emulated BIOS code in said third area.

30. The recording medium as set forth in claim 26, wherein said emulation code storing device stores said emulated BIOS code in said third area in a compressed condition.

31. The recording medium as set forth in claim 26, wherein said extension starter reads out an emulated BIOS code stored in said third area, and loads the thus read-out BIOS code into said first area to thereby initialize and start-up a designated extension.

32. The recording medium as set forth in claim 31, wherein said extension starter thaws said emulated BIOS code, if said emulated BIOS code is compressed.

33. The recording medium as set forth in claim 20, wherein said data processing apparatus includes a plurality of system buses, and wherein said extension is electrically connected to all of said system buses.

34. A recording medium readable by a computer, storing a program therein for causing a computer to carry out a method of starting-up an extension in which a memory which includes BIOS code having an architecture different from an architecture of a central processing unit is mounted, said method comprising the steps of:

(a) checking whether an emulated BIOS code for a designated extension exists in a memory;

(b) converting said emulated BIOS code into a machine language of an architecture executable by said central processing unit, and storing the thus converted machine language in said memory, if said emulated BIOS code does not exist in said memory; and (c) reading an emulated BIOS code for a designated extension out of said memory, and initializing and then starting-up said extension, if said emulated BIOS code exists in said memory.

35. The recording medium as set forth in claim 34, wherein said memory is a non-volatile read access memory.

36. The recording medium as set forth in claim 34, wherein said emulated BIOS code is stored in said memory in a compressed condition.

37. The recording medium as set forth in claim 36, further comprising the step of thawing said emulated BIOS code before said extension is initialized and started-up.

38. The recording medium as set forth in claim 34, further comprising the step of setting a flag indicating that emulation is properly implemented.

* * * * *

UNITED STATES PATENT AND TRADEMARK OFFICE
CERTIFICATE OF CORRECTION

PATENT NO. : 6,145,078
DATED : November 14, 2000
INVENTOR(S) : Edward L. Schmidt It is certified that error appears in the above-identified patent and that said Letters Patent is hereby corrected as shown below:

Claim 14,
Line 43 and 44, please delete "claim 1" and insert therefore -- claim 8 --.

Signed and Sealed this

Sixth Day of November, 2001

Attest:

NICHOLAS P. GODICI
Attesting Officer    Acting Director of the United States Patent and Trademark Office